(12) United States Patent
Utsugi (10) Patent No.: US 7,995,108 B2
(45) Date of Patent: Aug. 9, 2011

(54) IMAGE PROCESSING APPARATUS, IMAGE PROCESSING PROGRAM, ELECTRONIC CAMERA, AND IMAGE PROCESSING METHOD FOR IMAGE ANALYSIS OF MAGNIFICATION CHROMATIC ABERRATION

(75) Inventor: Akihiko Utsugi, Tokyo (JP)

(73) Assignee: Nikon Corporation, Tokyo (JP)

( * ) Notice: Subject to any disclaimer, the term of this patent is extended or adjusted under 35 U.S.C. 154(b) by 431 days.

(21) Appl. No.: 12/216,697

(22) Filed: Jul. 9, 2008

(65) Prior Publication Data

US 2008/0284869 A1 Nov. 20, 2008

Related U.S. Application Data

(63) Continuation of application No. PCT/JP2007/000155, filed on Mar. 1, 2007.

(30) Foreign Application Priority Data

Mar. 1, 2006 (JP) .................................. 2006-054450

(51) Int. Cl.
*H04N 5/225* (2006.01)
*G02B 13/16* (2006.01)
*G02B 5/32* (2006.01)
*G06K 9/00* (2006.01)

(52) U.S. Cl. ........ 348/222.1; 348/335; 359/16; 382/167
(58) Field of Classification Search ............... 348/222.1, 348/273, 231.6; 382/162, 166, 274, 167
See application file for complete search history.

(56) References Cited

U.S. PATENT DOCUMENTS

| 4,733,296 | A | | 3/1988 | Honbo et al. | |
|---|---|---|---|---|---|
| 5,353,056 | A | * | 10/1994 | Westerink et al. | 348/263 |
| 6,483,941 | B1 | * | 11/2002 | Li | 382/167 |
| 6,853,400 | B1 | * | 2/2005 | Matama | 348/96 |
| 2004/0150732 | A1 | | 8/2004 | Yamanaka | |
| 2005/0024508 | A1 | * | 2/2005 | Okisu et al. | 348/254 |
| 2005/0168644 | A1 | * | 8/2005 | Demas et al. | 348/630 |
| 2007/0103744 | A1 | * | 5/2007 | Chiba | 358/518 |
| 2007/0116375 | A1 | * | 5/2007 | Utsugi et al. | 382/264 |
| 2008/0062409 | A1 | | 3/2008 | Utsugi | |

FOREIGN PATENT DOCUMENTS

| JP | A-61-187485 | 8/1986 |
|---|---|---|
| JP | A-05-328367 | 12/1993 |
| JP | A-11-161773 | 6/1999 |
| JP | A-2002-230237 | 10/2002 |
| JP | A-2002-320237 | 10/2002 |
| JP | A-2002-344978 | 11/2002 |
| JP | A-2004-241991 | 8/2004 |
| JP | A-2004-286684 | 10/2004 |

(Continued)

*Primary Examiner* — Sinh Tran
*Assistant Examiner* — Selam Gebriel
(74) *Attorney, Agent, or Firm* — Oliff & Berridge, PLC (57) ABSTRACT

An image processing apparatus includes an image obtaining unit, a color shift detecting unit, a controlling unit, and a correction amount calculating unit. The image obtaining unit obtains image data. The color shift detecting unit detects color shifts of this image data. The controlling unit determines fitting reliability of the color shift detection result and selects a magnification chromatic aberration model suitable for color shift fitting according to the reliability. The correction amount calculating unit fits the magnification chromatic aberration model selected by the controlling unit to the color shift detection result and obtains correction amounts of the magnification chromatic aberration for the image data.

11 Claims, 4 Drawing Sheets

FOREIGN PATENT DOCUMENTS

| | | |
|---|---|---|
| JP | A-2005-151122 | 6/2005 |
| JP | A-2005-167896 | 6/2005 |
| JP | A-2005-202276 | 7/2005 |
| JP | A-2006-020275 | 1/2006 |

* cited by examiner

IMAGE PROCESSING APPARATUS, IMAGE PROCESSING PROGRAM, ELECTRONIC CAMERA, AND IMAGE PROCESSING METHOD FOR IMAGE ANALYSIS OF MAGNIFICATION CHROMATIC ABERRATION

CROSS-REFERENCE TO RELATED APPLICATION

This application is a Continuation application of International Application No. PCT/JP2007/000155, filed Mar. 1, 2007, designating the U.S., in which the International Application claims a priority date of Mar. 1, 2006, based on prior filed Japanese Patent Application No. 2006-054450, the entire contents of which are incorporated herein by reference.

BACKGROUND

1. Field

The present application relates to a technique for an image analysis of magnification chromatic aberration.

2. Description of the Related Art

Generally, in an electronic camera, it is known that a color shift occurs in imaged image data by magnification chromatic aberration of an imaging optical system thereof. Conventionally, there have been proposed techniques to detect the magnification chromatic aberration from this color shift of image data.

For example, Patent Document 1 (Japanese Unexamined Patent Application Publication No. 2002-344978) obtains magnification chromatic aberration between R and G in image data by finding a minimum point in differences between the R and G components while changing magnification of the R component with various magnification changing ratios.

In addition, Patent Document 2 (Japanese Unexamined Patent Application Publication No. 2002-320237) obtains the magnification chromatic aberration by detecting multiple color shifts in image data and by fitting a mathematical formula model to these color shifts.

Further, Patent Document 3 (Japanese Unexamined Patent Application Publication No. 2004-286684) discloses to fit a linear expression to color shifts in image data in a least square approach.

Usually, a magnification chromatic aberration model including a cubic expression of an image height is used for performing precise fitting of color shifts which changes complicatedly. However, when the cubic magnification chromatic aberration model is used, there arise the following problems.

(1) Easily Affected by a Color Shift Detection Error.

The color shifts detected in image data include detection errors caused by influences of a color structure specific to an object, a color noise, a false color, etc. other than the color shift caused by the magnification chromatic aberration. Meanwhile, the fitting in the cubic expression has a high degree of freedom and easily responds sensitively to these detection errors. Therefore, it may be probable to obtain wrong values for parameters in a mathematical formula model of the magnification chromatic aberration.

(2) The Color Shift Cannot Always be Detected at a Sampling Interval Sufficient for the Image Height.

For performing the fitting correctly on a bending point or the like in the cubic expression, it is necessary to detect the color shifts at a sampling interval appropriate for the image height. In some image data, however, a flat image structure occupies a certain area and the color shifts cannot always be detected in a sufficient sampling interval. When approximation by the cubic expression is performed in this situation, there is a high probability that wrong values are obtained for parameters in the mathematical formula model of the magnification chromatic aberration.

(3) There is a Case in which the Magnification Chromatic Aberration Cannot be Approximated by the Cubic Expression of the Image Height.

In a typical tendency, the color shift by the magnification chromatic aberration is proportional to the image height in a vicinity of an image center and changes nonlinearly against the image height in a peripheral image area. Such a behavior cannot always be approximated by the cubic expression. When approximation by the cubic expression is performed in this situation, there is a high probability that wrong values are obtained for parameters in the mathematical formula model of the magnification chromatic aberration.

(4) There is a Case in which Anisotropic Magnification Chromatic Aberration Occurs Some lenses may cause the magnification chromatic aberration asymmetric to an optical axis. Meanwhile, the color shift detection errors frequently have anisotropic components. Therefore, it is difficult to discriminate between the anisotropic magnification chromatic aberration and the anisotropic detection errors, and there is a high probability of obtaining wrong values for parameters in the mathematical formula model of the magnification chromatic aberration.

SUMMARY

The proposition is to estimate the magnification chromatic aberration appropriately from the color shift detection result of image data, in view of such problems.

An image processing apparatus is an apparatus that estimates magnification chromatic aberration of image data by fitting a magnification chromatic aberration model to a color shift detection result of the image data, the image processing apparatus including an image obtaining unit, a color shift detecting unit, a controlling unit, and a correction amount calculating unit.

The image obtaining unit obtains the image data.

The color shift detecting unit detects the color shift in this image data.

The controlling unit determines reliability of the fitting according to the color shift detection result, and selects a magnification chromatic aberration model suitable for the color shift fitting.

The correction amount calculating unit performs the fitting of the color shift detection result using the magnification chromatic aberration model selected by the controlling unit and obtains correction amount of the magnification chromatic aberration for the image data based on the fitting result.

In an image processing apparatus, the controlling unit evaluates and determines the reliability in the fitting of the color shift detection result based on at least one of evaluation items including a detection number of the color shift, a detection variation of the color shift, and a detection image height of the color shift. The controlling unit selects the magnification chromatic aberration model according to this reliability.

In an image processing apparatus, the controlling unit limits a degree of fitting freedom in the magnification chromatic aberration model according to the color shift detection result.

In an image processing apparatus, the controlling unit has, for options of the magnification chromatic aberration model, at least (1) a magnification chromatic aberration model expressing nonlinear magnification chromatic aberration against the image height and (2) a magnification chromatic aberration model expressing linear magnification chromatic aberration against the image height.

In an image processing apparatus, the controlling unit selects different magnification chromatic aberration models for a center image area and a peripheral image area, respectively.

In an image processing apparatus, the controlling unit selects the magnification chromatic aberration model expressing the linear magnification chromatic aberration against the image height for the center image area. The controlling unit selects the magnification chromatic aberration model expressing the nonlinear magnification chromatic aberration against the image height for the peripheral image area.

In an image processing apparatus, the controlling unit performs reliability determination of the color shift detection result for each image height range, and obtains an image height range satisfying a predetermined reliability condition, and sets the obtained image height range as the peripheral image area for using the nonlinear model.

In an image processing apparatus, the correction amount calculating unit fits the magnification chromatic aberration model to the color shift detection result by reducing an evaluation function $e(\Delta)$ of a fitting error $\Delta$ between the color shift detection result and the magnification chromatic aberration model. Here, this evaluation function $e(\Delta)$ satisfies the following formula for $\Delta 1 < \Delta 2$ in a possible range of the fitting errors.

$$e(\Delta 2)/e(\Delta 1) < (\Delta 2/\Delta 1)^2 \qquad [1]$$

In an image processing apparatus, the correction amount calculating unit obtains correction amount of an isotropic magnification chromatic aberration (hereinafter, referred to as global correction amount) by fitting the magnification chromatic aberration model to the color shift detection result. Further, the correction amount calculating unit obtains an area adjustment value for adjusting errors between said global correction amount and said color shift detection result for each image areas. The correction amount calculating unit obtains correction amount of an anisotropic magnification chromatic aberration based on the global correction amount and the area adjustment values obtained in this manner.

In an image processing apparatus, in the above described image processing apparatus, the correction amount calculating unit obtains a two-dimensional frequency map by classifying the color shift detection result to form frequency distributions for each image height. The correction amount calculating unit obtains the correction amounts of the magnification chromatic aberration by fitting the magnification chromatic aberration model to the two-dimensional frequency map.

An image processing program is a program causing a computer to function as any one of the above described image processing apparatuses.

An electronic camera includes any one of the above described image processing apparatuses and an imaging unit imaging an object to generate image data. This image processing apparatus obtains correction amount of the magnification chromatic aberration for the image data generated in the imaging unit.

An image processing method is a method performing the above described processing in any one of the above described image processing apparatuses.

The image processing apparatus selects a magnification chromatic aberration model suitable for the fitting according to the color shift detection result. As a result, it becomes possible to reduce errors in estimating the magnification chromatic aberration from the color shifts.

DETAILED DESCRIPTION OF THE EMBODIMENTS

<Description of a Configuration>

Figure 1:
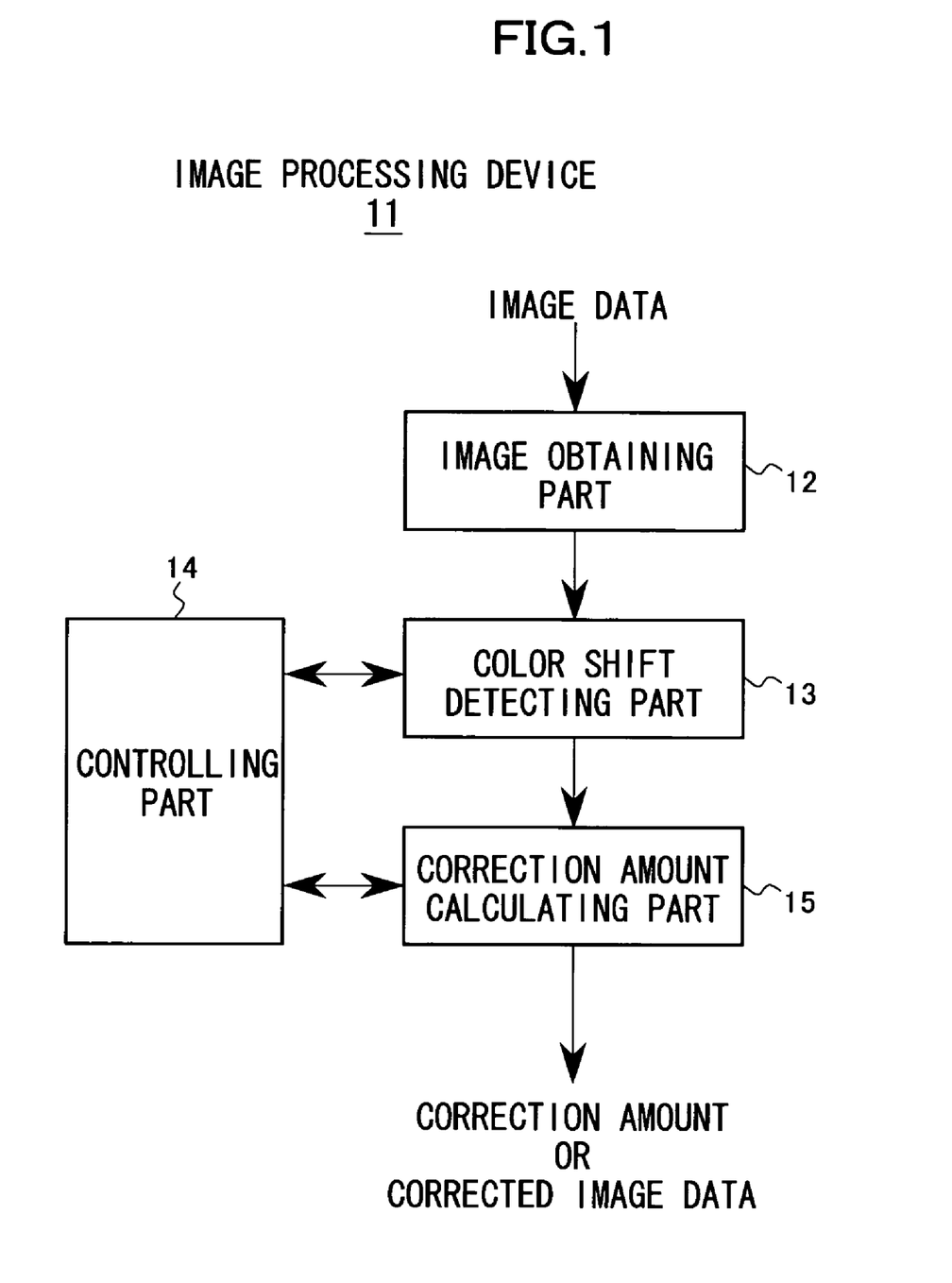
FIG. 1 is a block diagram showing an image processing device 11.

FIG. 1 is a block diagram of an image processing device 11.

In FIG. 1, the image processing device 11 is configured with the following constituent requirements.

an image obtaining part 12 obtaining image data to be a detection target of magnification chromatic aberration.

a color shift detecting part 13 detecting color shifts from the image data.

a controlling part 14 calculating reliability from a variation in a color shift detection result or the like, and selecting a magnification chromatic aberration model according to the reliability.

a correction amount calculating part 15 fitting the magnification chromatic aberration model selected by the controlling part 14 to the color shift detection result and thereby obtaining correction amounts for the magnification chromatic aberration of the image data.

Note that the above described constituent requirements may be realized by software in which a computer executes an image processing program. Further, the above described constituent requirements may be realized by hardware such as an arithmetic circuit.

<Description of Operation>

Figure 2:
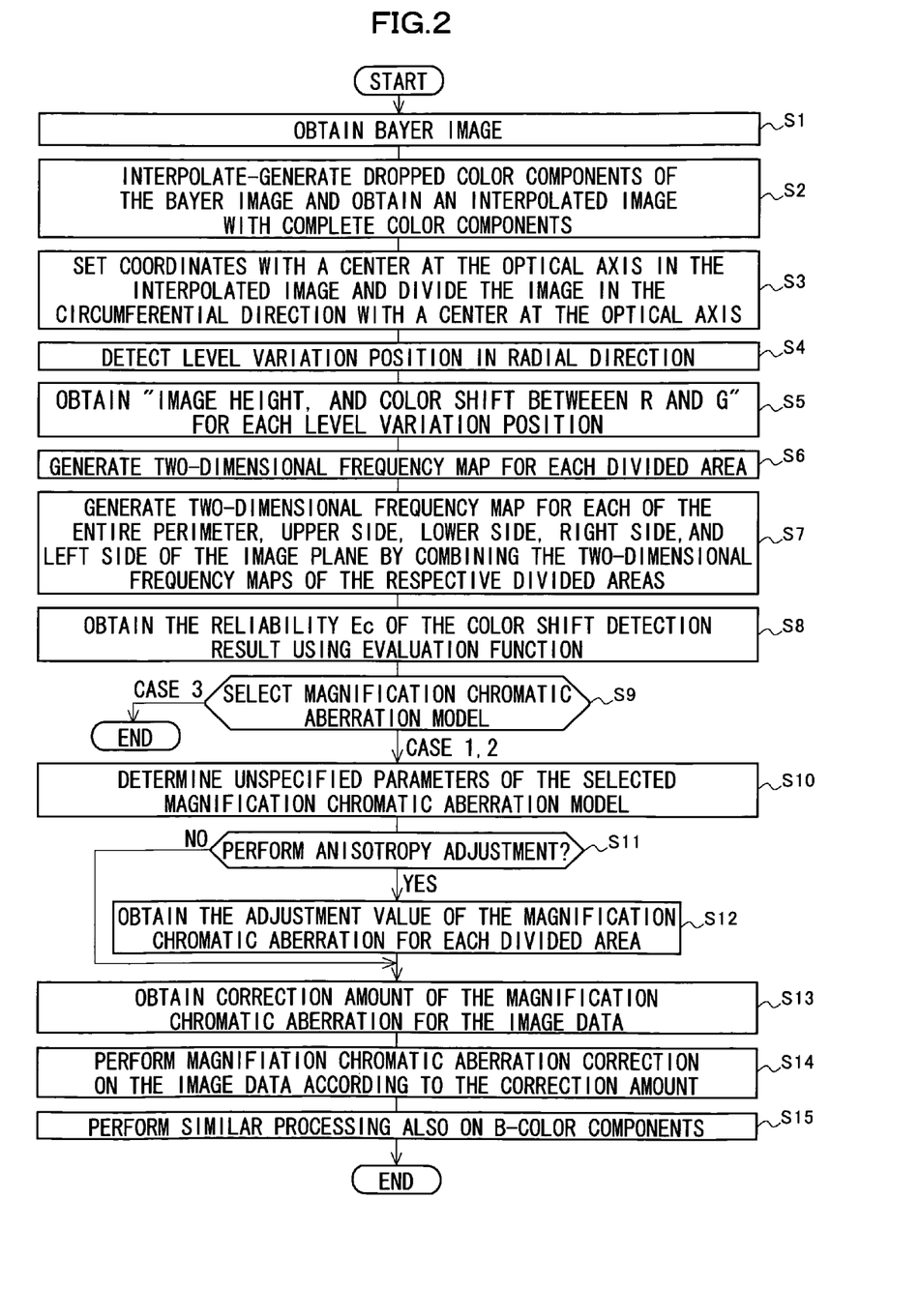
FIG. 2 is a flowchart illustrating operation of the image processing device 11.

FIG. 2 is a flowchart illustrating operation of the image processing device 11. The operation will be described with reference to this flowchart.

Operation S1: The image obtaining part 12 reads each pixel (x, y) of a Bayer image where RGB color components are arranged in a Bayer matrix. Here, a space of pixel coordinates is defined to be a righter side of an image plane for a larger x-coordinate and a lower side of the image plane for a larger y-coordinate.

Operation S2: The color shift detecting part 13 performs interpolation processing on each of the RGB color components of the Bayer image, makes up dropped color components for pixel unit, and generates an interpolated image having RGB color components in pixel unit.

Operation S3: The color shift detecting part 13 sets an optical axis center (cx, cy) of an imaging optical system in image plane coordinates of the interpolated image. In a default setting, an image plane center of the interpolated image is set to be this optical axis center. Note that the color shift detecting part 13 may obtain coordinate values of the optical axis center (cx, cy) from added information (Exif information or the like) of an input image.

Figure 3:
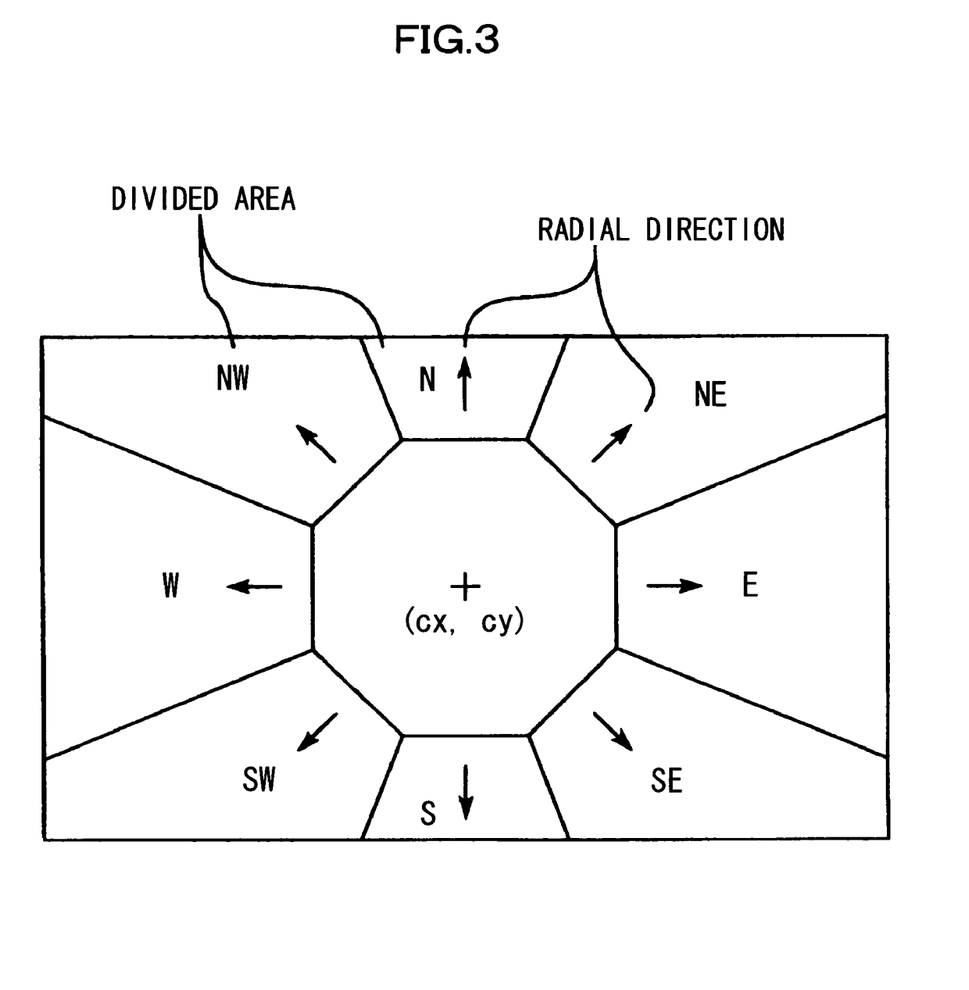
FIG. 3 is a diagram showing a dividing pattern of an image plane.

The color shift detecting part 13 divides the interpolated image in the circumferential direction having a center at the optical axis center (cx, cy) as shown in FIG. 3, and sets a plurality of divided areas (N, NE, E, SE, S, SW, W, and NW shown in FIG. 3) and a radial direction for each of the divided areas (arrow direction shown in FIG. 3).

Operation S4: Subsequently, the color shift detecting part 13 obtains luminance Y of each pixel from the RGB color components of each pixel in the interpolated image by a simplified calculation such as Y=(R+G+B)/3, for example. Then, the color shift detecting part 13 calculates a level variation grad Y(x, y) of the luminance Y along a radial direction in an image plane area where the magnification chromatic aberration can be visually recognized (e.g., peripheral area apart form the optical axis center by a distance of 40% or more of a maximum image height hmax).

Here, by fixedly setting the radial direction in each of the divided areas, it is possible to calculate the level variation along the radial direction in a simplified manner according to the following formulas.

Divided area N: $grad\ Y(x,y)=Y(x,y-1)-Y(x,y)$

Divided area NE: $grad\ Y(x,y)=Y(x+1,y-1)-Y(x,y)$

Divided area E: $grad\ Y(x,y)=Y(x+1,y)-Y(x,y)$

Divided area SE: $grad\ Y(x,y)=Y(x+1,y+1)-Y(x,y)$

Divided area S: $grad\ Y(x,y)=Y(x,y+1)-Y(x,y)$

Divided area SW: $grad\ Y(x,y)=Y(x-1,y+1)-Y(x,y)$

Divided area W: $grad\ Y(x,y)=Y(x-1,y)-Y(x,y)$

Divided area NW: $grad\ Y(x,y)=Y(x-1,y-1)-Y(x,y)$

The color shift detecting part 13 searches a pixel position (x, y) where an absolute value of the obtained level variation grad Y(x, y) is not less than a predetermined value Th (e.g., about ten levels in 256 gradation data) for a level variation position along the radial direction. Note that this search may be performed at appropriate intervals such as every six pixels, for example.

Operation S5: The color shift detecting part 13 performs range setting of a local window having a center at a position of the level variation position detected at the operation S4. The color shift detecting part 13 obtains an arrangement of the G-color components from this window.

Then, the color shift detecting part 13 obtains an arrangement of the R-color components from a range formed by shifting this window in a radial direction by a predetermined distance. The color shift detecting part 13 performs level correction of the R-color arrangement such that an average value of this R-color arrangement coincides with an average value of the G-color arrangement. The color shift detecting part 13 calculates a sum of absolute values of (G-color arrangement)–(R-color arrangement after the level correction) to obtain an overlap error.

The color shift detecting part 13, while increasing or decreasing the shift distance of the R-color arrangement along the radial direction, searches a shift distance where the overlap error becomes a minimum to obtain a color shift of the level variation position. The color shift detecting part 13 temporally stores the obtained color shift together with an image height value at the level variation position.

Note that it is preferable to obtain the color shift in a preciseness of not more than a pixel interval by interpolating the overlap error value.

Operation S6: The correction amount calculating part 15 generates a two-dimensional frequency map by counting frequencies of the "image heights and color shifts", obtained at the operation S5 at each of the level variation positions for each of the divided areas.

For example, the two-dimensional frequency map divides the range of an image height h0 to the maximum image height hmax into 40 divisions and a color shift range of −4 pixels to +4 pixels into 80 divisions, and counts the frequency for each of the total 3,200 divisions.

Note that, each time the operation 5 detects a color shift, it is preferable to update the two-dimensional frequency map of the corresponding divided area, for saving a buffer capacity required for the temporal storage of the "image heights and color shifts".

Operation S7: The correction amount calculating part 15 generates a two-dimensional frequency map of the entire perimeter of the image plane by combining the two-dimensional frequency maps of the respective divided areas. Further the correction amount calculating part 15 generates a two-dimensional frequency map of the upper side of the image plane by combining the two-dimensional frequency maps of the divided areas N, NE, and NW, and generates a two-dimensional frequency map of the lower side of the image plane by combining the two-dimensional frequency maps of the divided areas S, SE, and SW, in the same process. Furthermore, the correction amount calculating part 15 generates a two-dimensional frequency map of the right side of the image plane by combining the two-dimensional frequency maps of the divided areas E, NE, and SE, and generates a two-dimensional frequency map of the left side of the image plane by combining the two-dimensional frequency maps of the divided areas W, NW, and SW, in the same process.

Operation S8: The controlling part 14 sets a pitch ah to be about one tenth of the maximum image height hmax, and obtains:

n(h): the number of color shift detections in an image height range h to h+Δh, and $\sigma^2(h)$: a deviation of color shifts in the image height range h to h+Δh at predetermined intervals of the image height h (e.g., integer h).

Then, the controlling part 14 obtains reliability Ec of the color shift detection result by the following evaluation function, for example, for each of the image height range.

[Formula 1]

$$Ec(h0) = \sum_{h=h0}^{hmax-\Delta h} \frac{n(h)}{\sigma^2(h)}(h - h0) \qquad [2]$$

This evaluation function [2] shows a larger value when the number of the color shift detection is larger in an image height range not lower than an image height h 0. In addition, the evaluation function [2] shows a larger value when the variation of the color shift detection is smaller in the image height range not lower than the image height h 0. Further, the evaluation function [2] shows a larger value when the image height h of the color shift detection is higher in the image height range not lower than the image height h 0.

Operation S9: The controlling part 14 performs the following classification based on the reliability obtained at the operation S8 and selects a magnification chromatic aberration model.

(Case 1) Non-Linear Magnification Chromatic Aberration Model

The controlling part 14 determines whether or not there exists an image height h 0 satisfying three conditions: reliability Ec(h 0+1)<th 1, E c(h 0)>th 1, and h 0>th$_{linear}$.

Here, the threshold value $th_{linear}$ is a threshold value showing an upper limit of the image height h where the magnification chromatic aberration changes linearly and determined preliminarily in an experimental manner or in a statistical manner. For example, the threshold value $th_{linear}$ is set to be about a value of 4×Δh.

Meanwhile, the threshold value th 1 is a threshold value to determine whether or not the reliability of the peripheral area of the image plane is suitable for estimating nonlinearity of the magnification chromatic aberration and determined preliminarily in an experimental manner or in a statistical manner. For example, the threshold value th 1 is set to be about a value of 1,000.

If there exists an image height h 0 satisfying these three conditions, the image height h 0 is set to be a maximum value of a twist image height $h_{twist}$ and the following nonlinear magnification chromatic aberration model $f_{NL}(h)$ is selected.

[Formula 2]

$$f_{NL}(h) = \begin{cases} kh & (\text{if } h < h_{twist}) \\ kh + a(h - h_{twist})^2 - \frac{a}{3(h\max - h_{twist})}(h - h_{twist})^3 & (\text{if } h \geq h_{twist}) \end{cases} \quad [3]$$

Note that unspecified parameters k, a, and $h_{twist}$ in $f_{NL}(h)$ will be determined in the following operation S10.

(Case 2) Linear Magnification Chromatic Aberration Model

The controlling part 14 selects a linear magnification chromatic aberration model against the image height $f_L(h)=k \times h$, if the three conditions of the case 1 are not satisfied and Ec($th_{linear}$)>th 2 is satisfied.

Note that the threshold value th 2 is a threshold value determining whether or not the reliability of the peripheral area of the image plane is suitable for estimating linearity of the magnification chromatic aberration, and determined preliminarily in an experimental manner or in a statistical manner. For example, the threshold value th 2 is set to be about a value of 400.

(Case 3) Discontinuance of Magnification Chromatic Aberration Estimation

The controlling part 14 determines that the color shift detection result has a low reliability and is not suitable for estimating the magnification chromatic aberration, when both of the case 1 and the case 2 are not satisfied. In this case, the controlling part 14 discontinues the estimation and correction of the magnification chromatic aberration.

Operation S10: The correction amount calculating part 15 determines the unspecified parameters of the magnification chromatic aberration model by fitting the magnification chromatic aberration model selected by the controlling part 14 to the color shift detection result of the entire perimeter of the image plane (two-dimensional frequency map of the entire perimeter of the image plane).

(Case of the Magnification Chromatic Aberration Model of Case 1)

The correction amount calculating part 15 performs initial setting of default values close to correct solutions preliminarily obtained in a statistic manner to the unspecified parameters in the formula [3].

The correction amount calculating part 15 calculates a difference between a detected color shift value at a detection image height h and a value of the formula [3] $f_{NL}(h)$ at the detection image height h from the color shift detection result of the entire perimeter of the image plane (two-dimensional frequency map) and obtains a fitting error Δ.

The correction amount calculating part 15 evaluates each of the fitting errors Δ by the following evaluation function e(Δ).

$$e(\Delta)=|\Delta|$$

The correction amount calculating part 15 sums up obtained values from the evaluation function e(Δ) to obtain a fitting evaluation value Ef. Note that, when using the two-dimensional frequency map, it is possible to reduce a computation amount of the fitting evaluation values Ef by multiplying the evaluation function e(Δ) obtained for each of the divisions on the map by the number of the frequency in the division.

Further, the correction amount calculating part 15 obtains a nonlinearity penalty term $E_{NL}$ limiting a degree of freedom in the fitting by the following formula.

$$E_{NL}=P_{NL} \times |a| \times (h\max - h\,0)$$

Here, $P_{NL}$ is a coefficient determining a weight of the nonlinearity penalty term and determined preliminarily in an experimental manner or in a statistical manner considering an occurrence degree of nonlinear estimation errors. For example, $P_{NL}$ is set to be a value of about 300. Meanwhile, h 0 is h 0 satisfying the above described three conditions.

Note that, generally, the nonlinearity penalty term $E_{NL}$ may be set to be a small value when the unspecified parameter a has value within a predetermined range near zero and may be set to be a larger value when the value of the unspecified parameter goes out of the predetermined range.

The correction amount calculating part 15 determines the unspecified parameters k, a, and $h_{twist}$ such that (Ef+$E_{NL}$) becomes to have a minimum or least value, while changing the unspecified parameters k, a, and $h_{twist}$ in an appropriate pitch.

At this time, the unspecified parameter $h_{twist}$ is limited to a value not more than the image height h0 which satisfies the three conditions of the reliability. This limitation leads to a selection of the nonlinear magnification chromatic aberration model which shows the nonlinear magnification chromatic aberration against the image height for the peripheral area of the image having the image height not less than the image height $h_{twist}$ which satisfies the conditions of the reliability.

(Case of the Magnification Chromatic Aberration Model of Case 2)

The correction amount calculating part 15 performs initial setting of a default value close to a correct solution obtained preliminarily in a statistical manner to the unspecified parameter k in the linear magnification chromatic aberration model $f_L(h)$.

The correction amount calculating part 15 calculates a difference between a detected color shift value at a detection height h and a value of $f_L(h)$ at the detection height h from the color shift detection result of the entire perimeter of the image plane (two-dimensional frequency map) to obtain the fitting error Δ.

The correction amount calculating part 15 evaluates each of the fitting errors Δ by the following evaluation function e(Δ).

$$e(\Delta)=|\Delta|$$

The correction amount calculating part 15 sums up obtained values from the evaluation function e(Δ) to obtain the fitting evaluation value Ef. Note that, when using the two-dimensional frequency map, it is possible to reduce a computation amount of the fitting evaluation values Ef by multiplying the evaluation function e(Δ) obtained for each of the divisions on the map by the number of the frequency in the division.

The correction amount calculating part 15 determines the unspecified parameter k such that the fitting evaluation value E f becomes to have a minimum or least value, while changing the unspecified parameter k in an appropriate pitch.

Operation 11: The correction amount calculating part 15 judges variations of the fitting error Δ in each of the divided areas and determines whether or not anisotropic adjustment of the magnification chromatic aberration is performed.

If the variation is assumed to be within an allowable range of errors or the like, the correction amount calculating part 15 does not perform the anisotropic adjustment and assigns zeros to area adjustment values ke, ks, kw, and kn for each area, and moves the process to an operation S13.

Meanwhile, if the variation exceeds the allowable range, the correction amount calculating part 15 moves the process to an operation S12 to perform the anisotropic adjustment.

Operation S12: The correction amount calculating part 15 calculates the following formula using the two-dimensional frequency map of the right side of the image plane to obtain the area adjustment value ke of the right side area.

ke=[sum of (color shift detection value at a detection image height $h$–magnification chromatic aberration model value at the detection image height $h$)]/(sum of detection image heights $h$)

The correction amount calculating part 15 obtains the area adjustment values ks, kw, and kn for the lower side area, left side area and upper side area, respectively, by similar calculations.

Operation S13: The correction amount calculating part 15 obtains areas on an internal memory area for a correction amount map Δx(x, y) in the horizontal direction and a correction amount map Δy(x, y) in the vertical direction. The correction amount calculating part 15 completes these correction amount maps Δx and Δy by the following calculation processing.

First, the correction amount calculating part 15 calculates the image height h of coordinates (x, y) where a correction amount is to be obtained, using the coordinates of the optical axis center (cx, cy).

$h=[(x-cx)^2+(y-cy)^2]^{1/2}$

Then, the correction amount calculating part 15 obtains Δx(x, y) for each of the right side and the left side of the image plane according to the following formulas, respectively.

[Formula 3]

$$\Delta x(x, y) = \begin{cases} \left[\dfrac{f(h)}{h} + kw\right] \times (x - cx) & \text{(if } x < cx\text{)} \\ \left[\dfrac{f(h)}{h} + ke\right] \times (x - cx) & \text{(if } x \geq cx\text{)} \end{cases}$$ [4]

Here, for f(h) in the formula, $f_{NL}(h)$ is used for the case 1 and $f_L(h)$ is used for the case 2.

The correction amount calculating part 15 obtains Δy(x, y) for each of the upper side and the lower side of the image plane according to the following formulas, respectively, in the same process.

[Formula 4]

$$\Delta y(x, y) = \begin{cases} \left[\dfrac{f(h)}{h} + kn\right] \times (y - cy) & \text{(if } y < cy\text{)} \\ \left[\dfrac{f(h)}{h} + ks\right] \times (y - cy) & \text{(if } y \geq cy\text{)} \end{cases}$$ [5]

The correction amount maps Δx and Δy are completed by performing such a calculation sequentially for pixel unit except for the optical axis center.

Note that, as will be described below, when the magnification chromatic aberration correction is performed on R pixels of the Bayer image, the correction amount maps Δx and Δy may be generated only for pixel positions (x, y) of the R pixels in the Bayer matrix. Besides, the correction amount map may be obtained for discrete sample points such as at each predetermined number of pixels (32 pixels or the like) and the correction amount between the sample points may be obtained by interpolation. Further, the interpolation processing between the discrete sample points may be omitted by using the same correction amount for each block centering the discrete sample point. It is preferable to speed up the computation processing of the correction amount appropriately by such processing.

Operation S14: The correction amount calculating part 15 calculates a shift position (x', y') of the magnification chromatic aberration for each coordinate position (x, y) of the R-color component in the Bayer image by the following formula.

$x'=x+\Delta x(x,y)$ $y'=y+\Delta y(x,y)$

Then, the correction amount calculating part 15 obtains the R-color component at the shift position (x', y') by interpolation in the R-color components of the Bayer image. For this interpolation, a publicly known interpolation technique such as the cubic interpolation or the like can be used. The correction amount calculating part 15 completes the magnification chromatic aberration correction for the R-color components of the Bayer image by replacing sequentially the R-color component at the coordinates (x, y) by the interpolated R-color component at the shift position (x', y').

Operation S15: The image processing device 11 performs processing similar to the processing in the operations S5 to S14 also for B-color components of the Bayer image.

By the above described processing, it is possible to obtain the correction amounts of the magnification chromatic aberration and a Bayer image after the magnification chromatic aberration correction.

<Advantages of the Embodiment and the Like>

The present embodiment selects the magnification chromatic aberration model in which a fitting error is unlikely to occur, for the case 2 having a low reliability in the color shift detection result. As a result, it becomes possible to reduce the correction amount errors of the magnification chromatic aberration.

In addition, in the case 1 having a high reliability in the color shift detection result, the magnification chromatic aberration model which has a high degree of freedom is selected for a more precise fitting of the magnification chromatic aberration. As a result, the correction amounts of the magnification chromatic aberration become more precise.

Further, the present embodiment judges the reliability of the color shift detection result using the evaluation function, formula [2]. This formula [2] includes the following evaluation items.

Color shift detection number: A smaller detection number causes a fitting shortage in the magnification chromatic aberration model, resulting in a lower reliability.

Color shift detection variation: A larger detection variation causes an imprecise fitting in the magnification chromatic aberration model, resulting in a lower reliability.

Color shift detection image height: A smaller detection image height provides a shorter color shift distance and causes a lower detection preciseness of the color shift. Therefore, a smaller detection image height causes a lower fitting reliability.

By combining these three evaluation items, it becomes possible to precisely evaluate the fitting reliability for the color shift detection result.

In addition, the present embodiment selects a linear magnification chromatic aberration model for a center image area daringly even in the case 1. Typically, the magnification chromatic aberration changes almost linearly against the image height in the center image area. Therefore, by selecting the linear magnification chromatic aberration model for the center image area, it is possible to obtain correction values for a nearly actual magnification chromatic aberration.

Further, the formula [3] of the present embodiment couples the two magnification chromatic aberration models smoothly at the image height $h_{twist}$, and provides characteristics that a second-order derivative becomes close to zero at a vicinity of the maximum image height hmax where the color shift detection result is short. These characteristics are close to that of the actual magnification chromatic aberration and thereby it is possible to obtain a correction value for a further nearly actual magnification chromatic aberration.

In addition, the present embodiment obtains the image height range equal not less than the image height h 0 which satisfies the three conditions, as an image height range satisfying the reliability in the case 1. $h_{twist}$ is set so as to include this image height range, and the nonlinear magnification chromatic aberration model is selected for the peripheral image area having an image height not less than $h_{twist}$. By this processing, the fitting reliability of the nonlinear magnification chromatic aberration is secured and it becomes possible to reduce the correction amount errors in the peripheral image area.

Further, the present embodiment uses $e(\Delta)=|\Delta|$ instead of the square error $\Delta^2$ of the least square approach as an evaluation function of the fitting error $\Delta$ between the color shift detection result and the magnification chromatic aberration model. The least square approach can provide a satisfactory fitting result when measurement errors follow the normal distribution. However, the color shift detection errors include factors caused by the image structure or false color and do not follow the normal distribution, and thereby a large measurement error is easily caused frequently and abruptly. Therefore, in the least square approach, there arises a possibility that the fitting responds too sensitively to this large measurement error and can not be performed correctly. On the other hand, the evaluation function $e(\Delta)=|\Delta|$ in the present embodiment responds not too sensitively to the large measurement error compared with the least square approach and it becomes possible to perform a more appropriate fitting of the magnification chromatic aberration.

In addition, the present embodiment limits the degree of freedom of the unspecified parameters related to the nonlinearity by introducing the nonlinear penalty term. As a result, a variation of the unspecified parameter caused by the detection error is suppressed and it becomes possible to obtain a fitting of a magnification chromatic aberration model based on a more actual case.

Further, the present embodiment obtains the global correction amount by fitting the isotropic magnification chromatic aberration model to the color shift detection result in the entire perimeter of the image plane. Furthermore, the area adjustment value reflecting the anisotropy of the magnification chromatic aberration is obtained from the comparison between this global correction amount and the color shift detection result in each area. By combining this global correction amount and the area adjusting value for each area, it is possible to obtain an appropriate correction amount of the anisotropic magnification chromatic aberration.

In addition, the present embodiment generates the two-dimensional frequency map by classifying the color shift detection results to form the frequency distribution for each of the image heights. Generally, it is necessary to obtain the color shift detection results of more than a hundred to several thousands for calculating the correction amount of the magnification chromatic aberration precisely. Storing all of these color shift detection results requires a large storage capacity. Besides, a computation amount becomes huge for calculating the evaluation values in the fitting processing. By using the two-dimensional frequency map, however, similar color shift detection results can be stored in the number of frequency and it becomes possible to save the storage capacity for the color shift detection results. In addition, in the fitting processing using the two-dimensional frequency map, it becomes possible to reduce considerably the computation amount of the fitting evaluation values by multiplying the evaluation function $e(\Delta)$ obtained for each division on the map by the frequency number in the division.

<Supplements to the Embodiment>

Note that, in the foregoing embodiment, the fitting reliability is evaluated by the combination of the three evaluation items (detection number, detection variation, and detection image height). However, the embodiment is not limited to this method. The fitting reliability may be evaluated by use of at least one of the three evaluation items.

In addition, the foregoing embodiment uses the fitting error evaluation function $e(\Delta)=|\Delta|$. However, the embodiment is not limited to this function. An evaluation function $e(\Delta)$ satisfying the following formula may be used for any $\Delta 1 < \Delta 2$ in the possible range of the fitting error.

$$e(\Delta 2)/e(\Delta 1) < (\Delta 2/\Delta 1)^2 \quad [1]$$

Such an evaluation function is more resistant than the square error $\Delta^2$ in the least square approach against the large measurement error, and it becomes possible to perform a satisfactory fitting of the magnification chromatic aberration model.

Figure 4:
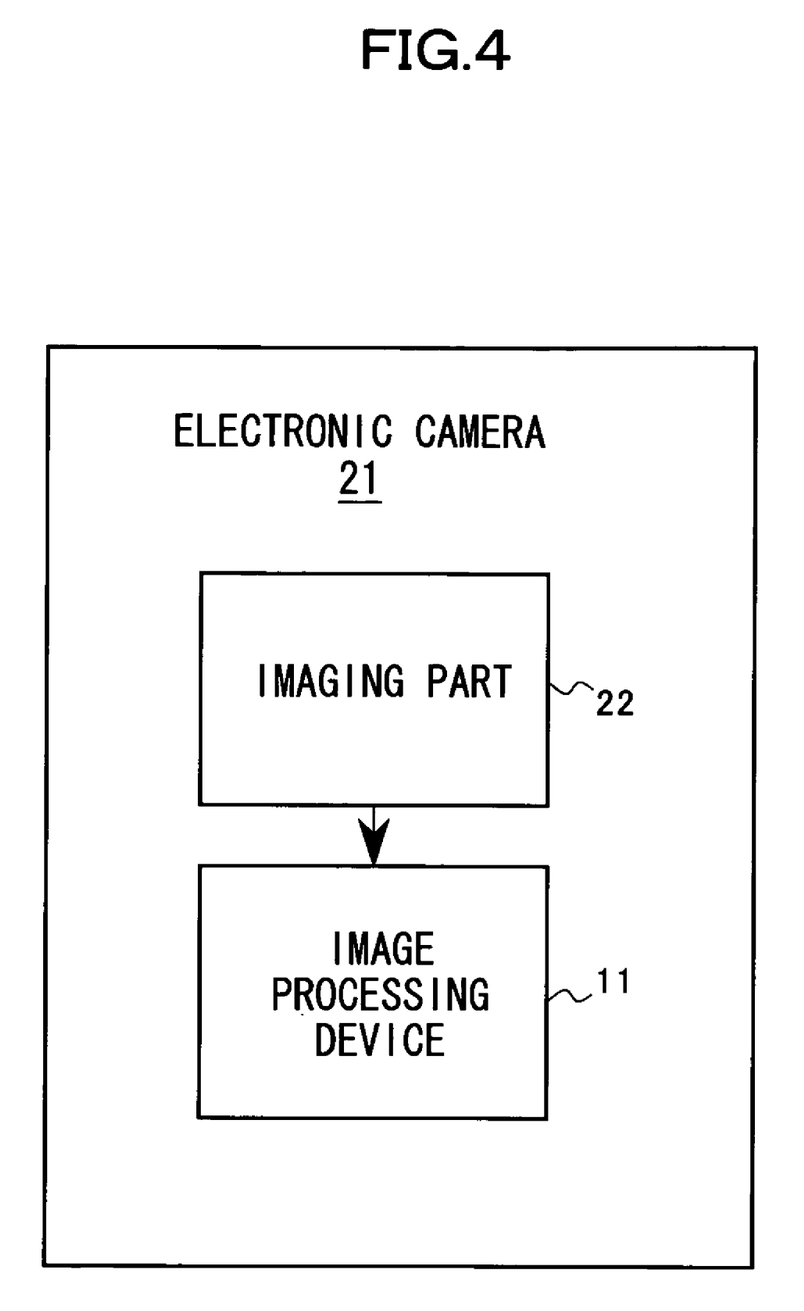
FIG. 4 is a block diagram showing an electronic camera 21.

Further, the foregoing embodiment has described a single component of the image processing device 11. However, the embodiment is not limited to the single component. For example, the image processing device 11 may be mounted in an electronic camera 21 as shown in FIG. 4. In this electronic camera 21, the image processing device 11 can obtain the correction amounts of the magnification chromatic aberration for a photographed image or a stored image in the imaging part 22 and further perform the magnification chromatic aberration correction.

Note that the foregoing embodiment uses the mathematical formula model coupling a linear expression and a cubic expression formula for the nonlinear magnification chromatic aberration model. However, the present embodiment is not limited to this formula model. Generally, any nonlinear mathematical formula model may be used.

In addition, the foregoing embodiment estimates the magnification chromatic aberration with the Bayer image as an object to be processed. However, the embodiment is not limited to this object to be processed. Generally, the present embodiment can be applied to any image as far as the color shift is detected.

Note that the present embodiment can be implemented in other various manners without departing form the spirit and principal features thereof. Accordingly, the foregoing shows only an example in every aspect thereof and should not be construed in a limiting sense. The scope of the present embodiment is defined in the claims and is not limited by the description in the specification in any way. Further, all the modifications or variations in the range of the equivalents to the claims fall within a scope of the present embodiment.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claims is:

1. An image processing apparatus that obtains a correction amount for a shift of position of a color component of image data due to a magnification chromatic aberration by fitting a magnification chromatic aberration model to a color shift detection result of the image data, the image processing apparatus comprising:
    an image obtaining device obtaining the image data;
    a color shift detecting device detecting color shift in said image data;
    a controlling device determining reliability of said fitting according to said color shift detection result and selecting a magnification chromatic aberration model suitable for the fitting of said color shift; and
    a correction amount calculating device performing the fitting of said color shift detection result using said magnification chromatic aberration model selected by said controlling device and obtaining the correction amount for the shift of position of the color component of the image due to the magnification chromatic aberration based on the fitting result, wherein
    said controlling device has, as options for said magnification chromatic aberration model, at least
    a magnification chromatic aberration model expressing a nonlinear magnification chromatic aberration against an image height, in which the magnification chromatic aberration is a function of the image height, and
    a magnification chromatic aberration model expressing a linear magnification chromatic aberration against the image height.

2. The image processing apparatus according to claim 1, wherein
    said controlling device evaluates and determines a reliability in the fitting of said color shift detection result based on evaluation items including a detection number of said color shift, a detection variation of said color shift, and a detection image height of said color shift and selects said magnification chromatic aberration model according to said reliability.

3. The image processing apparatus according to claim 1, wherein said controlling unit:
    selects said magnification chromatic aberration model expressing the nonlinear magnification chromatic aberration against the image height, in which the magnification chromatic aberration is a function of the image height, when the reliability of said fitting is higher than a predetermined standard; and
    selects said magnification chromatic aberration model expressing the linear magnification chromatic aberration against the image height when the reliability of said fitting is lower than a predetermined standard.

4. The image processing apparatus according to claim 1, wherein said controlling device selects the magnification chromatic aberration model expressing the nonlinear magnification chromatic aberration against the image height, in which the magnification chromatic aberration is a function of the image height, a magnification chromatic aberration model expressing the linear magnification chromatic aberration against the image height at a center image area and expressing the nonlinear magnification chromatic aberration against the image height at a peripheral image area.

5. The image processing apparatus according to claim 4, wherein
    said controlling device performs a reliability determination on said color shift detection result for each image height range, and obtains an image height range satisfying a predetermined reliability condition, and sets the obtained image height range as said peripheral image area.

6. The image processing apparatus according to claim 1, wherein
    said correction amount calculating device fits said magnification chromatic aberration model to said color shift detection result by reducing an evaluation function e ($\Delta$) of a fitting error $\Delta$ between said color shift detection result and said magnification chromatic aberration model, said evaluation function e ($\Delta$) satisfying the following formula for any $\Delta 1 < \Delta 2$ in a possible range of the fitting errors $e(\Delta 2)/e(\Delta 1) < (\Delta 2/\Delta 1)^2$ . . . [1].

7. The image processing apparatus according to claim 1, wherein said correction amount calculating device obtains a correction amount of isotropic magnification chromatic aberration, referred to as global correction amount, by fitting said magnification chromatic aberration model to said color shift detection result, obtains an area adjustment value for adjusting errors between said global amount and said color shift detection result for image areas, and obtains a correction amount of an anisotropic magnification chromatic aberration based on said global correction amount and said area adjustment value.

8. The image processing apparatus according to claim 1, wherein
    said correction amount calculating device obtains a two-dimensional frequency map by classifying said color shift detection result to form frequency distributions for each image height and obtains the correction amount of the magnification chromatic aberration by fitting said magnification chromatic aberration model to said two-dimensional frequency map.

9. A computer readable non-transitory medium storing an image processing program causing a computer to function as an image processing apparatus according to claim 1.

10. An electronic camera that obtains a correction amount for a shift of position of a color component of image data due to a magnification chromatic aberration by fitting a magnification chromatic aberration model to a color shift detection result of the image data generated by capturing an image, the electronic camera comprising:
    an imaging device imaging an object to generate said image data;
    a color shift detecting device detecting a color shift in said image data;
    a controlling device determining reliability of said fitting according to said color shift detection result and selecting a magnification chromatic aberration model suitable for the fitting of said color shift; and
    a correction amount calculating device performing the fitting of said color shift detection result using said magnification chromatic aberration model selected by said controlling device and obtaining the correction amount for the shift of position of the color component of the image due to magnification chromatic aberration based on the fitting result, wherein said controlling device has, as options for said magnification chromatic aberration model, at least a magnification chromatic aberration model expressing a nonlinear magnification chromatic aberration against an image height, in which the magnification chromatic aberration is a function of the image height, and a magnification chromatic aberration model expressing a linear magnification chromatic aberration against the image height.

11. An image processing method performed by an image processing apparatus that obtains a correction amount for a shift of position of a color component of image data due to a magnification chromatic aberration by fitting a magnification chromatic aberration model to a color shift detection result of the image data, the image processing method comprising:

an image obtaining operation obtaining the image data by an image obtaining device;

a color shift detecting operation detecting a color shift in said image data;

a controlling operation determining reliability of said fitting according to said color shift detection result and selecting a magnification chromatic aberration model suitable for the fitting of said color shift by a controlling device; and a correction amount calculating operation performing the fitting of said color shift detection result using said magnification chromatic aberration model selected at said controlling operation and obtaining the correction for said image data for the shift of position of the color component of the image due to the magnification chromatic aberration based on the fitting result, wherein said controlling device has, as options for said magnification chromatic aberration model, at least a magnification chromatic aberration model expressing a nonlinear magnification chromatic aberration against an image height, in which the magnification chromatic aberration is a function of the image height, and a magnification chromatic aberration model expressing a linear magnification chromatic aberration against the image height.

* * * * *